United States Patent [19]

Billsund

[11] 4,087,869

[45] May 9, 1978

[54] TOILET IN WHICH SOLID WASTES ARE COLLECTED AND DECOMPOSED

[76] Inventor: Enok Gerhard Billsund, Hyltebruk, Sweden

[21] Appl. No.: 733,078

[22] Filed: Oct. 18, 1976

Related U.S. Application Data

[63] Continuation-in-part of Ser. No. 531,790, Dec. 11, 1974, abandoned.

[51] Int. Cl.² ............... A47K 11/02; C05F 3/06
[52] U.S. Cl. ................... 4/111; 4/DIG. 12; 4/DIG. 19
[58] Field of Search ............ 4/1, 10, 11, 111, 116, 4/118, 131, 133, DIG. 12, DIG. 19; 259/8, 23, 24

[56] References Cited

U.S. PATENT DOCUMENTS

| | | | |
|---|---|---|---|
| 930,319 | 8/1909 | Short | 4/DIG. 12 |
| 2,513,382 | 7/1950 | Turnbow et al. | 259/8 |
| 3,259,917 | 7/1966 | Rascov | 4/10 |
| 3,522,613 | 8/1970 | Botsford | 4/DIG. 19 |
| 3,609,772 | 10/1971 | Howard | 4/115 |
| 3,699,040 | 10/1970 | Reid | 4/10 X |
| 3,725,963 | 4/1973 | Speer | 4/131 |
| 3,840,907 | 10/1974 | Sundberg | 4/111 |
| 3,873,445 | 3/1975 | Bussard | 4/10 X |

FOREIGN PATENT DOCUMENTS

| | | | |
|---|---|---|---|
| 1,093,803 | 11/1954 | France | 4/115 |
| 2,262,593 | 12/1972 | Germany | 4/115 |
| 169,446 | 10/1922 | United Kingdom | 4/115 |

OTHER PUBLICATIONS

Humis Toilet, 10/1972, Switzerland Publication.

Primary Examiner—Richard E. Aegerter
Assistant Examiner—Stuart S. Levy
Attorney, Agent, or Firm—Albert L. Jeffers; Roger M. Rickert

[57] ABSTRACT

A lavatory bench, or toilet, in which solid wastes are collected and biologically decomposed. The bench comprises a container beneath the seat and near the top of the container is a rotary member to which material is supplied and which, while rotating, distributes the material within the container. The container is advantageously heated. A casing is provided which supports the seat and which surrounds the container and from which there leads a lead stack, or outlet pipe. The rotation of the aforesaid member causes air circulation within the device and promotes the movement of air out through the outlet pipe. The rotatable member near the top of the container also serves the function of shutting off the inside of the container from view.

8 Claims, 2 Drawing Figures

TOILET IN WHICH SOLID WASTES ARE COLLECTED AND DECOMPOSED

This application is a Coninuation-in-Part of copending application Ser. No. 531,790 filed Dec. 11, 1974, now abandoned.

The present invention relates to a lavatory bench, or toilet, for receiving and storing body wastes, expecially wastes, or feces.

Increasing recreational activity, both on land and on the water have led, both from the authorities and from individuals, an increasing demand for suitable latrine, or toilet, installations. Chemical lavatories, or toilets, have been developed and offer valuable alternatives to other forms for collection and removal of body wastes. Further, there are devices known which decompose the waste products biologically and without the supplying of water or chemicals thereto.

The employment of the lavatories referred to above have, however, caused new problems to be presented. Thus, there exists a need to conceal the decomposed compost, as the waste products are collecting in containers arranged inside the lavoratory benches, and also a need to eliminate or at least to reduce the odor from the compost.

Hitherto, odors have been masked by the odor of added chemical decontamination agents. Further, it has been suggested to mask the unpleasant color and to reduce the impression of the waste products collected and to change the consistency of the compost to a fluid condition to facilitate cleaning. In spite of these measures, however, the several inconveniences have not been resolved in a satisfactory way. Instead, the steps taken can only be considered as compromises and, at best, to reduce the inconveniences.

Further, the toilet according to the invention can be arranged to that when a fixed quantity of waste products has been conveyed to and collected in one container for compost, another container can receive the material whereby the quantity of compost in the first container is allowed sufficient time for decomposition without more waste products being added to the container. Due to the spreading of the material inside the container by the rotating disc, the compost presents a large area which considerably shortens the time for decomposition.

Further advantages and aims for the lavatory bench, or toilet, according to the invention will be apparent in the following detailed description, reference being made to the attached schematic drawing, which shows a partial cross section of a lavatory bench according to one preferred embodiment of the invention.

BRIEF DESCRIPTION OF THE DRAWINGS

Like reference numbers indicate like or similar elements in the two drawings.

DETAILED DESCRIPTION OF THE INVENTION

Figure 1:
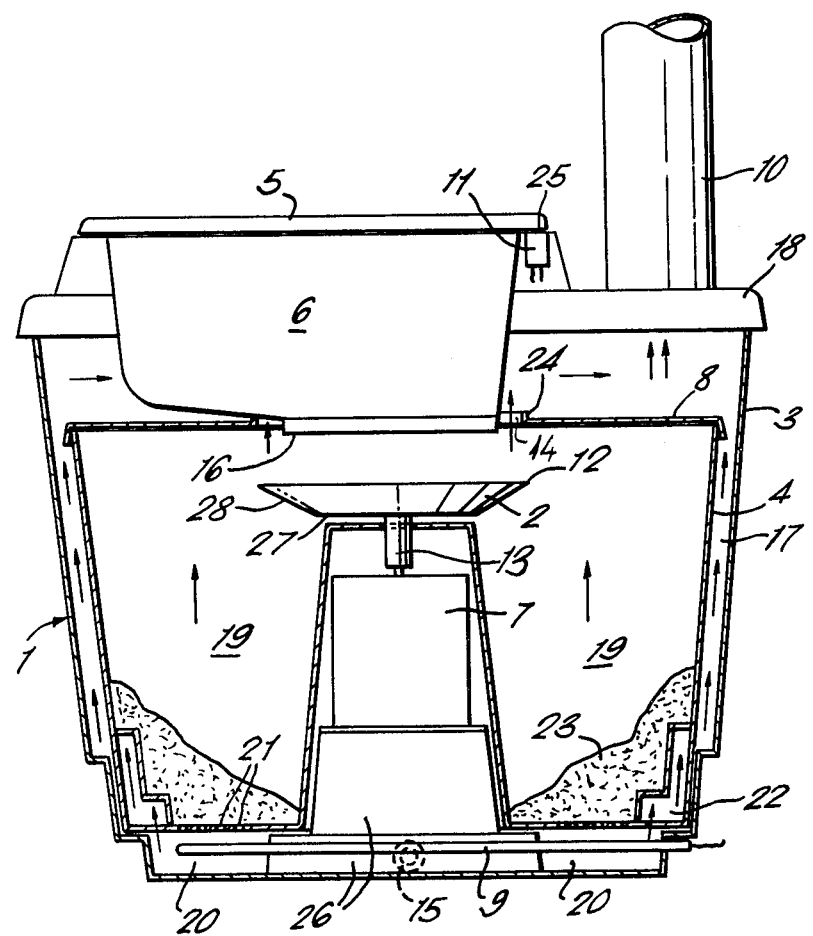
FIG. 1 is a side view partially in section illustrating the invention in one form.

Referring to FIG. 1, numeral 1 generally designates a lavatory bench, or toilet, having a casing consisting of an upper part 18 and a lower part 3. The upper part can be arranged for sealing against the lower part as, for example, by way of a press fit. The peripheral edge of the upper part 18 may incline outwardly in the downward direction to facilitate nesting together of the parts. At least one container 4 for compost is arranged in the casing part 3, and which container is equipped with a container cover 8. A dish-like member 2 is arranged in container 4, and is designed for propelling material supplied thereto radially outwardly in container 4 to spread and distribute the material in the container. The compost 23 is collected in the bottom part of container 4, and preferably around the lower, outer edge of the container as shown in the drawing.

In lower part 3 of the casing near the bottom wall of container 4 there is a heating element 9, which, for example, may consist of an electric heater or the like. Space 20 can be constituted by the space between the bottom of container 4 and the bottom of casing part 3.

An outlet pipe 10 connected to casing part 18, or to an upper region of casing part 3, is arranged for conveying air from inside the casing to the outside.

The upper part 18 of the casing is provided with a seat and on the seat is arranged a lid 5, which covers the seat and which may be hingedly supported. Extending downwardly from the seat and toward member 2 is a vessel 6 having an opening in the bottom, the lower edge 16 of which extends through an opening 14 surrounded by flange 24 in the second container for urine and if used, also through an opening in a container cover 8. The opening in the container cover or second container is somewhat wider than the edge 16 of vessel 6, whereby the air in the space 19 inside the container can be withdrawn from the container and be exhausted through outlet pipe 10.

The member 2 is rotatably mounted and at least the working surface or edge 12 thereof is circular, whereby material supplied to the member 2, is expelled from the member by centrifugal force as the member rotates and falls down towards the bottom of the container 4.

A feature of the lavatory bench, or toilet, according to the present invention consists in that fact, that the member 2 is disposed substantially horizontally beneath the opening in the bottom of vessel 6 and at least the upper working surface thereof is dish-shaped or is planar. Further, the member is driven via the driving shaft of a driving device 7, for example, an electric motor.

The electric motor is energized for driving the member 2 via a switch mechanism 11, which has an actuating member, such as pin 25, arranged in connection with the lid 5 and in such a manner, that when the lid is opened, the motor 7 is energized and the driving of the member 2 is initiated. Alternatively, member 2 can be driven by a mechanical device, for example, by way of a handle, or treadle device or the like, which is mechanically connected to the member.

Further, member 2 can be shaped in such a way that during rotation it operates as a blowing fan and is arranged in such a way that it acts on the air inside the casing and the container to cause the air to circulate therein and to pass out through the outlet pipe 10. The effect as a blowing fan of the member 2 is particularly advantageous because when the lid 5 is opened, air is drawn in through the seat, whereby noxious odors are prevented from emerging through the opening in the seat.

Preferably, member 2 has a central location in the casing, whereby the driving device 7, and which can be mounted on a base plate 26, has a central location in the casing or in a recess formed upwardly into the center of the bottom of container 4.

In this manner, the container 4 surrounds the driving device and the base plate while the outer side wall of the container thereof is spaced outwardly from the peripheral edge of the member 2.

The device may be provided with two containers for compost, which are arranged diametrally therein. In that case, the heating element 9 is arranged centrally in the casing, but below the containers, whereby a desirable air circulation can be obtained inside the casing, and a suitable temperature can be maintained for the decomposing of the compost.

The member 2 is located in such a position, that it blocks off the main space inside of the container 4 from view. As the member 2 is self-cleaning and preferable has a diameter which exceeds that of the lower edge 16 of the vessel 6, it is avoided that a distasteful visual impression is received from the inside of the device through the seat.

A guiding element, shaped as an adjustable flange or an equivalent device, can be adjustably arranged adjacent to and extending along a part of the edge 12 of member 2. The guiding element is adjustable into certain positions and has, for example, a sealing strip, a sleeve device, or a similar device for sealing or closing off a part of the edge of member 2. When two containers for compost are used, material supplied to member 2 can be conveyed to a selected one of the containers by suitable adjustment of the guiding element. When the desired quantity of waste product has been received in one container, the guiding device is adjusted, for example by turning 180°, and the material is then supplied to the other container. The collected compost can thus be allowed sufficient time to be converted or to be decomposed biologically in each container.

Rotation of the member 2 obtains a uniform spreading in the container of the material supplied to the member, whereby a uniform and faster decomposition of the material is obtained.

Figure 2:
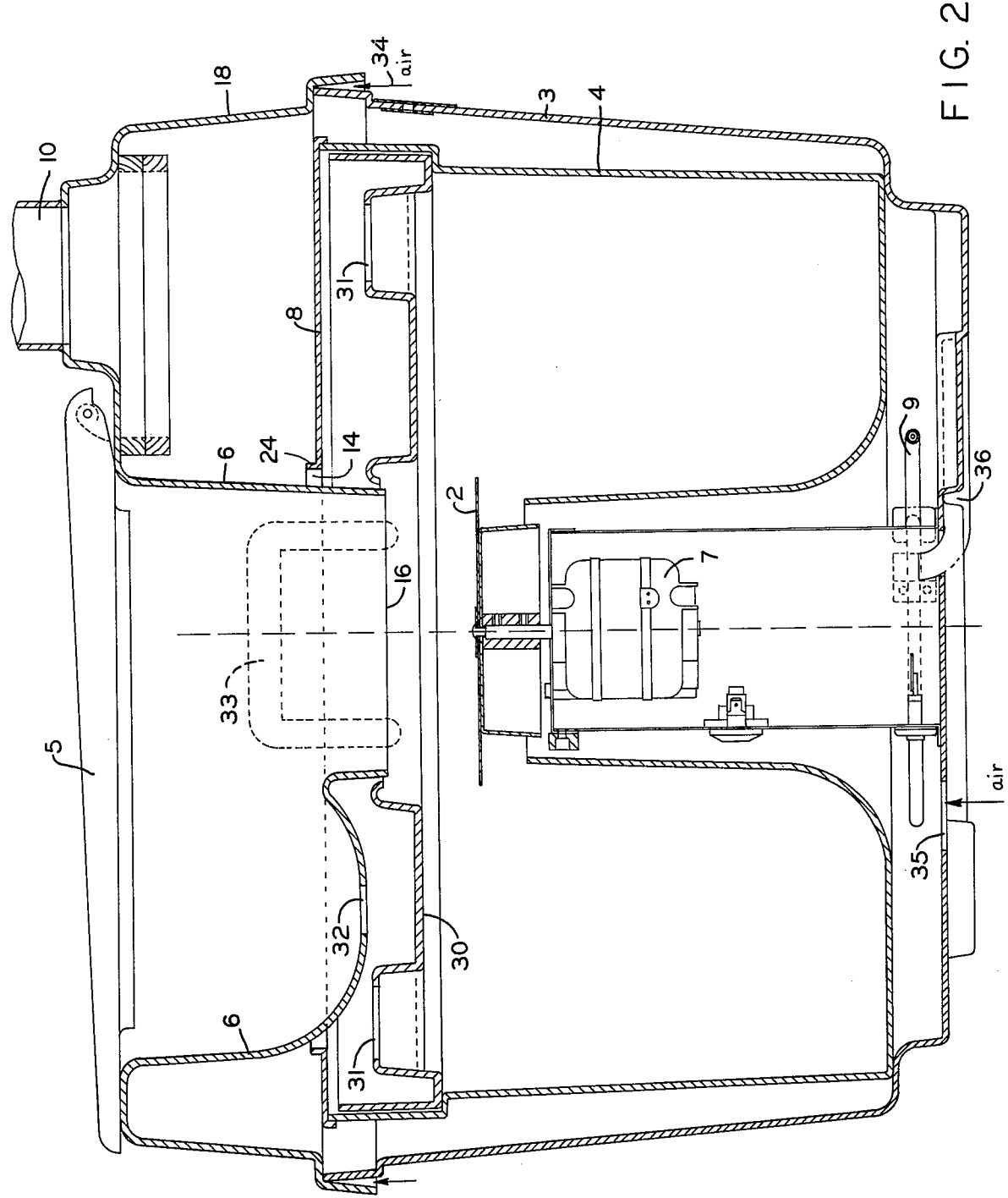
FIG. 2 is a side view partially in section illustrating the invention in another form.

The most essential difference with the FIG. 2 version of the lavatory bench compared with the bench according to the FIG. 1 version is an added urine container 30 as a alternate container arranged to collect urine. Therefore, the bowl 6 shows a new shape with an added draining hole 32 to drain urine to said urine container. The urine container is provided with four air holes 31, which also can have a function as a spillway if the container contrary to expectation is filled up. The collected urine is vaporized and evacuated by sucking out through the outlet pipe 10. The urine container has also a function as a cover for the container 4 for compost but the urine container or the container for compost can be furnished with a cover on the top. It is possible to arrange a handle 33 to the container 4 for compost to make it easier to lift up the container from the casing for emptying, which is necessary about once a year. The bowl 6 and the upper part of casing 18 are in the embodiment shown in FIG. 2 worked out in a single piece. To the casing 18 is arranged an outlet pipe 10, which preferably is arranged easily removable for the emptying process of the container for compost and can consist of a tube. Further, a box, which can be arranged to a wall behind the bench, is connected to the outlet pipe. This box contains a fan or blower, which is continuously driven and communicates with the outlet pipe and suck out the air from the bench. The fan can be continously driven as it is only necessary with a small fan with low consumption of energy, for example a 19 Watt fan. The box also contains a switch to start the motor for the dish member 2. When managing the switch, which for example is shaped as a button, one only had to press it during 2 – 3 seconds, whereby the dish member 2 rotates. The dish member is totally cleaned after one second of rotating so actually one only had to start the dish member by pressing the button a moment. The dish member is planar and six-edged, that is with an angular shaped configuration but it is thinkable to give an another shape to the dish member, for example plane and circular, convex and circular, convex and four-edged etc. The lower part of casing 3 can be provided with upwards reaching shoulders or the like at the top to obtain a narrow opening approximately 5 millimeters between the upper 18 and lower 3 parts of casing as an air inlet, see also the arrow 34. The bottom of the casing is furnished with holes 35 as inlets for air to circulate through the bench and out through the holes 31 in the second container 30 and at last out to the atmosphere through the outlet pipe 10. The designation 36 shows an eventual electrical cable for the electrical motor. When using known devices of this kind in several buildings in an local area, there will be an odor in the atmosphere, which depends on the discharges from the lavatory benches. By using a lavatory bench according to the invention, there will not be any odors in the atmosphere. That can depend on the fact that the temperature can be kept relatively low inside the bench, that is below 30° C (85° F) or preferably about 28° C. This is workable as the urine is collected in a separate container. Thus, in summer, when it is hot, one does not need to use the heating element. As the temperature is kept low there will be low consumption of energy. Urine does not smell at a temperature below 30° C so there is no risk either for smell of urine inside the building. For security one can also arrange a coal screen, which can take away eventually rests.

Modifications of the lavatory bench, or toilet, described and shown are possible without deviating from the invention. Thus, the container can be differently shaped, for example, an extensible box, whereby the changing of containers can be easily accomplished, which within some fields of application is desirable.

Further, member 2 can be arranged in such a way, that it could be caused to rotate at different occasions and at different speeds. Member 2 can have a shape as shown in the drawing, namely, with a circular bottom 27 and an inclined edge-flange 28 or, as mentioned, it could be substantially planar or be concave upwardly.

The seat, and especially the shape of the casing can be varied in several ways, and, in the main, are limited in shape only in view of the shape of the vital parts of the lavatory bench contained within the casing.

Modifications may be made within the scope of the appended claims.

I claim:

1. A toilet arrangement, especially for collecting waste products, and comprising: an outer casing having a ring-like seat on the top, a compost container in the casing beneath the seat, an opening in the top of the compost container, a bowl element beneath said seat and having an opening in the bottom aligned with the opening in the top of the compost container, a urine container mounted on said compost container and disposed between the compost container and the bowl element, the bowl element having a draining hole for draining urine from the bowl element to the urine container, a rotatable member disposed in the upper part of said compost container beneath the opening therein comprising a disc-like element disposed substantially horizontally and beneath the opening in the bottom of the bowl element and rotatable on a vertical axis, the disc-like element obstructing visibility of the inside of the compost container through the seat, and drive means connected to said member for driving the member in rotation thereby to distribute waste material supplied to said member through said seat in said compost container.

2. A toilet arrangement according to claim 1 in which said member is circular when viewed in plan and is rotatable on a central vertical axis.

3. A toilet arrangement according to claim 2 in which said member is disposed substantially horizontally and is concave upwardly.

4. A toilet arrangement according to claim 2 in which said member has a planar horizontal bottom part and a flange inclining upwardly in the radially outer direction from the periphery of said bottom part.

5. A toilet arrangement according to claim 1 in which said compost container and casing have bottom walls and said compost container is supported with the bottom wall spaced from the bottom wall of the casing, and a heating element in the space between said bottom walls.

6. A toilet arrangement according to claim 1 in which said compost container has a bottom wall and is formed with a central downwardly opening recess in the bottom wall, said casing also having a bottom wall and a base member on the bottom wall of the casing, said drive means being mounted on said base member and extending into said recess and being connected to said rotatable member through the top wall of said recess, said bottom walls being spaced apart, and an electric heater in the space between said bottom walls and surrounding said base member.

7. A toilet arrangement according to claim 1 in which said member is substantially planar and is rotatable about an axis substantially perpendicular to the plane thereof.

8. A toilet arrangement according to claim 1 wherein the urine container includes a plurality of air holes adapted to function as overflow spillways.

* * * * *